Figure 1:
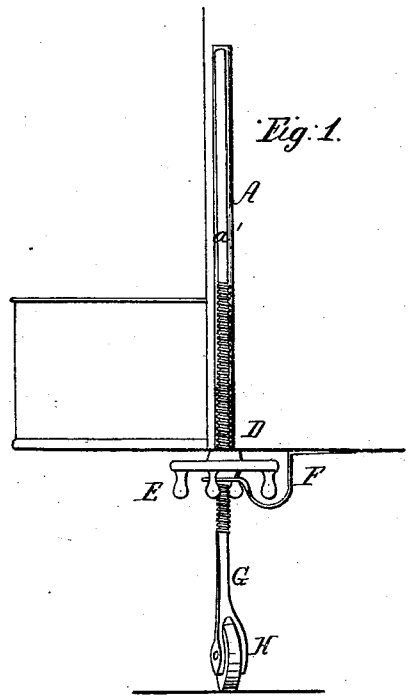

B. I. Day.
Car Replacer.
No. 85,732. Patented Jan. 12, 1869.

Witnesses:
Robert Boyd
Jas. H. Franklin

Inventor,
Benjamin I. Day

BENJAMIN I. DAY, OF VANDERBURG COUNTY, INDIANA.

Letters Patent No. 85,732, dated January 12, 1869.

IMPROVED DEVICE FOR TURNING STREET-CARS.

The Schedule referred to in these Letters Patent and making part of the same.

*To all whom it may concern:*

Be it known that I, BENJAMIN I. DAY, of the county of Vanderburg, and State of Indiana, have invented a new and improved Means of Turning Street-Cars; and I do hereby declare that the following is a full, clear, and exact description thereof, which will enable those skilled in the art to make and use the same, reference being had to the accompanying drawings, forming part of this specification.

Like letters indicate like parts on the drawing.

This invention relates to an improved method of turning street-cars, whereby turn-tables can be dispensed with, and the cars turned anywhere on the route, and is made of iron or other suitable material.

My plan to accomplish the aforesaid object is to let down a pivot at the rear end of the car, and a truck at the forward end of the car, so as to lift the wheels of the car clear of the track, by means of which it can be turned.

Figure 2:
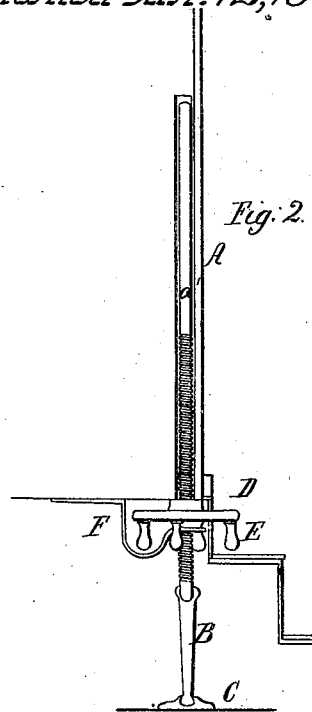
Figure 4:
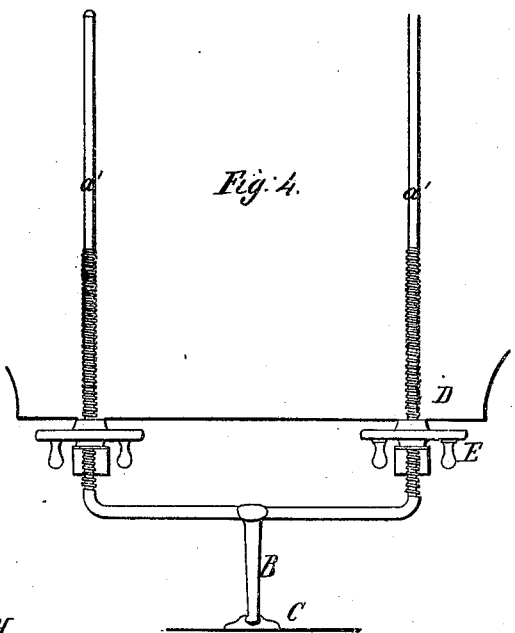

The pivot consists of a bar or rod, of sufficient strength, shaped as shown in Figure 4, the prongs of which, *a' a'*, pass up through the bottom of the car, and work in tubes or collars A, Figures 1 and 2, which tubes or collars are fastened to the wall or body of the car.

The pivot-leg, B, figs. 2 and 4, terminates in an adjustable disk or foot-piece, by means of a ball-and-socket joint, C, figs. 2 and 4.

The pivot is worked by means of male screws, cut on the lower part of the prongs, working in female screws, cut in hubs of hand-wheels D, Figures 1, 2, 3, and 4, which hand-wheels are provided with hand-holds or knobs, to facilitate their being turned, E, figs. 1, 2, 3, and 4, and are secured in position by supports F, fastened to bottom of car, and so shaped as not to interfere with the movement of the wheels.

Figure 3:
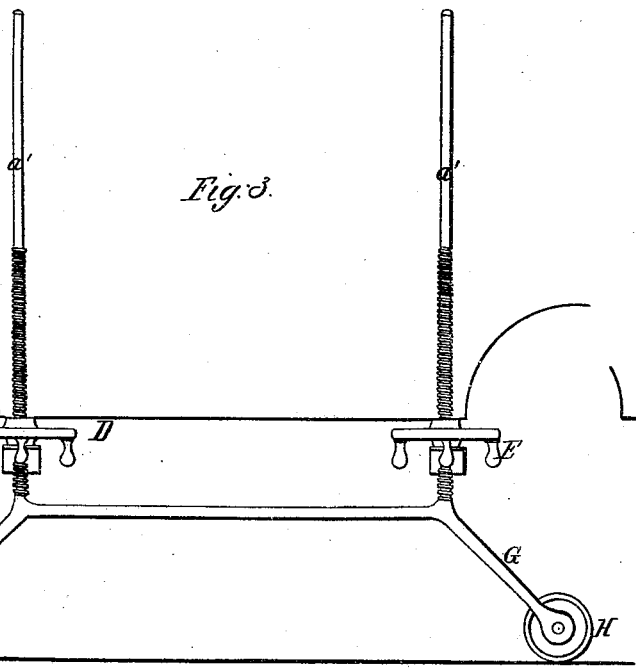

The truck, working like the pivot, consists of a rod, or bar, of sufficient strength, shaped as shown in fig. 3, and terminates in legs on each side, provided with small wheels, H, which wheels are set to run in a circle, the centre of which is the pivot B, figs. 2 and 4.

It is intended the wheels H H should be as far apart as convenient, to guard against upsetting.

Having thus described my invention, I wish it to be understood that I do not broadly claim a wheeled truck and pivot for replacing or turning cars upon the track, such having been used before; but

What I do claim as my invention, and desire to secure by Letters Patent, is—

The combination, with a street or other railroad-car, of the tubes or collars A, the truck, fig. 3, and pivot, fig. 4, with screw-prongs *a' a'*, hand-wheels D, small wheels H, placed tangentially to a circumference struck from socket C as a centre, the pivot-pin B, and socket and disk C, the whole constructed and arranged substantially as and for the purpose set forth.

BENJAMIN I. DAY.

Witnesses:
JAMES M. SCANTLIN,
JOE S. WINN.